(12) United States Patent
Zhang et al.

US009623403B2

(10) Patent No.: US 9,623,403 B2
(45) Date of Patent: Apr. 18, 2017

(54) NAPHTHA REFORMING CATALYST AND PREPARATION METHOD THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Daqing Zhang, Beijing (CN); Gaoshan Zang, Beijing (CN); Yuhong Zhang, Beijing (CN); Jiaxin Wang, Beijing (CN); Tao Wang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 0 days.

(21) Appl. No.: 14/831,526

(22) Filed: Aug. 20, 2015

(65) Prior Publication Data

US 2016/0051969 A1 Feb. 25, 2016

(30) Foreign Application Priority Data

Aug. 25, 2014 (CN) .......................... 2014 1 0423123

(51) Int. Cl.
*B01J 23/40* (2006.01)
*B01J 23/42* (2006.01)
*B01J 23/44* (2006.01)
*B01J 27/10* (2006.01)
*B01J 37/04* (2006.01)
*B01J 37/08* (2006.01)
*B01J 37/06* (2006.01)
*B01J 32/00* (2006.01)
*B01J 27/13* (2006.01)
*B01J 27/053* (2006.01)
*B01J 35/10* (2006.01)
*B01J 37/03* (2006.01)
*B01J 21/04* (2006.01)
*B01J 23/656* (2006.01)
*B01J 37/00* (2006.01)
*B01J 37/02* (2006.01)
*B01J 23/63* (2006.01)

(52) U.S. Cl.
CPC .............. *B01J 27/13* (2013.01); *B01J 21/04* (2013.01); *B01J 23/6567* (2013.01); *B01J 27/053* (2013.01); *B01J 32/00* (2013.01); *B01J 35/10* (2013.01); *B01J 35/1019* (2013.01); *B01J 35/1061* (2013.01); *B01J 37/0018* (2013.01); *B01J 37/0201* (2013.01); *B01J 37/031* (2013.01); *B01J 37/06* (2013.01); *B01J 23/63* (2013.01)

(58) Field of Classification Search
CPC ... B01J 21/04; B01J 23/40; B01J 23/42; B01J 23/44; B01J 23/462; B01J 23/464; B01J 23/468; B01J 23/63; B01J 27/10; B01J 27/053; B01J 27/13; B01J 35/10; B01J 35/1019; B01J 35/1061; B01J 35/108; B01J 35/1095; B01J 37/04; B01J 37/08; B01J 37/105; B01J 37/031; B01J 37/0018; B01J 37/0201; B01J 37/06; B01J 32/00; B01J 23/6567
USPC ....... 502/217, 224, 230, 302, 305, 332, 334, 502/339; 423/626, 628
See application file for complete search history.

(56) References Cited

U.S. PATENT DOCUMENTS

| | | | | |
|---|---|---|---|---|
| 3,169,827 A * | 2/1965 | De Rosset | ............. | B01J 23/883 208/213 |
| 3,864,461 A * | 2/1975 | Miller | ...................... | B01J 21/04 208/216 R |
| 4,613,585 A * | 9/1986 | Takumi | .................... | B01J 21/04 423/626 |
| 6,518,219 B1 * | 2/2003 | Yang | ........................ | B01J 21/04 423/625 |
| 7,041,866 B1 | 5/2006 | Gillespie | | |
| 2005/0027154 A1 | 2/2005 | Vassilakis et al. | | |
| 2011/0105313 A1 * | 5/2011 | Oudart | ..................... | B01J 21/04 502/213 |

FOREIGN PATENT DOCUMENTS

| | | |
|---|---|---|
| CN | 1246517 A | 3/2000 |
| CN | 1055961 C | 8/2000 |
| CN | 1112245 C | 6/2003 |
| CN | 1205315 C | 6/2005 |
| CN | 1312039 C | 4/2007 |
| CN | 100999328 B | 4/2011 |
| CN | 102139221 B | 11/2012 |
| CN | 103285859 A | 9/2013 |
| CN | 103285895 A | 9/2013 |

* cited by examiner

*Primary Examiner* — Patricia L Hailey
(74) *Attorney, Agent, or Firm* — Novick, Kim & Lee, PLLC; Allen Xue

(57) ABSTRACT

A naphtha reforming catalyst, comprising an alumina support and following components with the content calculated on the basis of the support: VIII group metal 0.1-2.0% by weight, VIIB group metal 0.1-3.0% by weight, sulfate ion 0.45-3.0% by weight, and halogen 0.5-3.0% by weight. The catalyst is used in a naphtha reforming reaction without presulfurization and has a high aromatization activity and a selectivity.

20 Claims, No Drawings

NAPHTHA REFORMING CATALYST AND PREPARATION METHOD THEREOF

TECHNICAL FIELD

The present invention relates to a hydrocarbon conversion catalyst and preparation method thereof, in particular, relates to a naphtha reforming catalyst and preparation method thereof.

BACKGROUND

Catalytic reforming is a process with $C_6$-$C_{12}$ naphtha fractions as feedstocks for producing high-octane gasoline, aromatics and hydrogen by subjecting the feedstock hydrocarbon molecules to reforming reactions such as dehydrogenation of cycloalkane, dehydroisomerization of straight chain alkane and dehydrocyclization of paraffins, etc. in the presence of hydrogen and catalysts at a certain temperature and a pressure. A supported bifunctional reforming catalyst widely adopted in current catalytic reforming technology comprises the hydrogenation/dehydrogenation function provided by a metal component and the acidic isomerization function provided by a support. The reforming catalyst is typically a bi(or multi)metallicatalyst using active alumina as the support and Pt as the major metal component, and comprising a second metal component such as rhenium, tin or germanium.

As for the bifunctional reforming catalyst, the metallic function and the acidic function act synergistically on the catalytic reforming reaction in a certain matching degree. If the hydrogenation/dehydrogenation active function of the metal is too strong, carbon deposit on surfaces of the reforming catalyst will increase rapidly, which goes against the proceeding of the reforming reaction; and if the function of the metal is too weak, the activity of the catalyst will decrease. If the acidity is too strong, the hydrocracking activity of the catalyst is comparatively strong and the liquid yield of the reforming product will decrease; and if the acidity is too weak, the activity will decrease. Therefore, the balanced match between the acidic function and metallic function of the support determines the activity, selectivity and stability of the catalyst.

In addition, as for a platinum-rhenium reforming catalyst, since the metal rhenium has a quite high hydrogenolysis activity, if the activity of rhenium is not passivated at the beginning of operation, a drastic hydrogenolysis reaction will occur in the initial state of feed supply, which releases a great amount of reaction heat to make the temperature of the catalyst bed rise rapidly and cause an overtemperature phenomenon. Once such a phenomenon occurs, serious consequences tend to be caused. Minor consequences include a large amount of carbon deposit of the catalyst, which decreases the activity and stability of the catalyst; and serious consequences include burning out the catalyst, reactor and internal components. Hence, the platinum-rhenium reforming catalyst needs to be presulfied before feedstock injection. The excessive hydrogenolysis reaction of a fresh catalyst is reduced through presulfurization so as to protect the activity and stability of the catalyst and improve the selectivity of the catalyst. Methods for presulfarization of the platinum-rhenium catalyst include two types, one of which introduces $H_2S$ into hydrogen and carries out presulfurization of the catalyst slowly under temperature and pressure, and the other of which injects organic sulfides such as dimethyl disulfide and dimethyl sulfide and so on into hydrogen under certain temperature and pressure and uses $H_2S$ formed after decomposition of these organic sulfides for presulfurization of the catalyst. The first method is usually used in laboratory investigation and the second method is widely used for a start-up of industrial devices of the platinum-rhenium catalyst. These two methods both have the nature of presulfurizing the catalyst with $H_2S$ and both pertain to gas-phase sulfurization. The presulfurization of the platinum-rhenium reforming catalyst has problems of equipment corrosion, environmental pollution and security risks and the like.

Sulfate ions in the reforming catalyst are generally considered to hurt performances of the catalyst and are poisons to the catalyst. CN98117895.2 discloses a method of removing sulfate ions from the reforming catalyst by introducing organic chlorine compounds, which are decomposed into hydrogen chloride in presence of hydrogen at 400° C. to 600° C., into the catalyst bed poisoned with sulfate ions so as to remove them. This method can effectively remove the sulfate ions on the catalyst compared with the conventional regeneration of the catalyst by an oxychlorination process.

CN 102139221B discloses a platinum-rhenium reforming catalyst comprising 0.1 to 0.3% by weight of sulfate ions. Said sulfate ions are introduced through a co-impregnation or separate-impregnation method during the preparation of the catalyst. The catalyst as obtained can contact the reforming feedstock for the reforming reaction without presulfurization step. The catalytic performance and stability are improved and the start-up operation procedure is simplified.

SUMMARY OF THE INVENTION

The object of the present invention is to provide a naphtha reforming catalyst and a process for preparing the said reforming catalyst. The catalyst comprises an appropriate amount of sulfate ions and can be prepared with cheap raw materials. It is used for the naphtha reforming reaction and has a high aromatization activity and a high selectivity.

The naphtha reforming catalyst provided in the present invention comprises a sulfate ion-containing alumina support and the following components with the content calculated on the basis of the support:

| | |
|---|---|
| VIII group metal | 0.1-2.0% by weight, |
| VIIB group metal | 0.1-3.0% by weight, |
| Sulfate ion | 0.45-3.0% by weight, |
| halogen | 0.5-3.0% by weight, | wherein said sulfate ion-containing alumina support has content of sodium of 0.008 to 0.03% by weight, and in the said catalyst, the ratio of the pore volume of the pores with a pore radius between 3 nm and 10 nm to the total pore volume is from 60 to 85%; the ratio of the pore volume of the pores with a pore radius smaller than 3 nm to the total pore volume is not more than 36%; and the ratio of the pore volume of the pores with a pore radius larger than 10 nm to the total pore volume is more than 2%.

The catalyst of the present invention uses alumina with a high content of sulfate ions as the support and obtains a catalyst by loading the said support with active components. Said catalyst can be used in the naphtha catalytic reforming reaction without presulfurization and has an improved activity and selectivity.

DETAILED DESCRIPTION

The catalyst of the present invention uses alumina comprising an appropriate amount of sulfate ions as the support and obtains a reforming catalyst by loading the said alumina support with active components. The sulfate ions in the support are preferably derived from sulfates used in the alumina preparation process. Preferably, the prepared alumina support goes through a hydro-thermal treatment to increase the distribution proportion of the pores with the pore radius more than 3 nm.

There are a variety of methods for preparing the precursor of the alumina support of the reforming catalyst—pseudo-boehmite, wherein a major method for preparing the pseudo-boehmite comprises the precipitation of cheap sodium aluminate with aluminum sulfate and the following aging and washing to obtain pseudo-boehmite powders. The sulfate ions contained in aluminum sulfate can not only act as a source of the sulfate ions in the alumina support but also reduce the washing times for removing sulfate ions in the conventional process. It only needs to reduce the sodium content in alumina support to a specified value.

The catalyst of the present invention preferably comprises a high content of sulfate ions. The sulfate ions are preferably derived from aluminum sulfate used in the alumina preparation process.

Said sulfate ion-containing alumina support of the catalyst of the present invention preferably has content of sodium of 0.01 to 0.03% by weight, more preferably 0.013 to 0.02% by weight.

The catalyst according to the present invention preferably further comprises 0.01 to 3.0% by weight, based on the support, of rare earth elements selected from the group consisting of ytterbium, yttrium, europium and/or cerium.

The content of the components of the catalyst in the present invention based the support is preferably as follows:

| | |
|---|---|
| VIII group metal | 0.1-1.0% by weight, |
| VIIB group metal | 0.1-2.0% by weight, |
| Sulfate ion | 0.45-2.0% by weight, |
| halogen | 0.5-2.0% by weight. |

If the catalyst comprises rare earth elements of ytterbium, yttrium, europium and/or cerium, their content is preferably in the range of 0.1 to 1.0% by weight.

The VIII group metal in the catalyst of the present invention is preferably platinum, ruthenium, rhodium and/or iridium, more preferably platinum; the VIIB group metal is preferably rhenium; and the halogen is preferably chlorine.

The specific surface area, as measured by the use of low-temperature Nitrogen adsorption, of the catalyst is preferably in the range of 180 to 300 m$^2$/g, more preferably in the range of 210 to 250 m$^2$/g.

The catalyst of the present invention preferably has a high proportion of the pores with the pore radius larger than 3 nm. That is, the pores with the pore radius larger than 10 nm account for an elevated proportion; the pores with the pore radius smaller than 3 nm account for a lowered proportion; and the pores with the pore radius between 3 and 10 nm are in the majority and have a centralized distribution. The catalyst of the present invention preferably has the pore distribution as follows: the ratio of the pore volume of the pores with the pore radius between 3 and 10 nm to the total pore volume is from 70% to 85%, preferably from 75% to 85%; the ratio of the pore volume of the pores with the pore radius smaller than 3 nm to the total pore volume is not more than 25%, preferably from 5% to 25%; more preferably, the ratio of the pore volume of the pores with the pore radius smaller than 3 nm to the total pore volume is not more than 15%, preferably from 5% to 15%; and the ratio of the pore volume of the pores with a pore radius larger than 10 nm to the total pore volume is more than 5%. In the pore distribution, the ratio of the pore volume of the pores with a pore radius larger than 10 nm to the total pore volume is more preferably from 5 to 10%.

The sulfate ions in the catalyst of the present invention are preferably introduced during the preparation process of the support alumina. Methods for preparing the said alumina include the neutralization-precipitation method of aluminate salts, the neutralization-precipitation method of aluminium salts, the neutralization-precipitation method of aluminum sol and the hydrolysis method of aluminium alkoxide. Preferably, the neutralization-precipitation method of aluminate salts is used for preparation of the sulfate ion-containing alumina.

The preferred method for preparing the catalyst provided in the present invention comprises the following steps:

(1) mixing sodium aluminate and aluminum sulfate in a molar ratio of 1 to 10:1, controlling the pH value of the solution to between 7 and 11 to obtain a precipitation, then aging at a temperature in the range of 60° C. to 150° C., and the solid substance obtained subjecting to water-washing and drying to produce a pseudo-boehmite powder containing sulfate ions, wherein the sulfate ions have content of 0.45% to 3.0% by weight based on the alumina;

(2) adding an acidic solution in the pseudo-boehmite powder produced in step (1) for kneading and extruding, then drying and calcinating to produce the alumina support containing sulfate ions;

(3) optionally subjecting the support produced in step (2) to a hydro-thermal treatment at a temperature in the range of 450° C. to 850° C.;

(4) impregnating the support of step (2) or the support optionally subjecting to the hydro-thermal treatment in step (3) with an aqueous solution comprising the VIII group metal, the VIIB group metal and the halogen as an impregnation solution, then drying and calcinating the impregnated solid.

Step (1) of the above method relates to the preparation of the pseudo-boehmite powder containing sulfate ions. Sodium aluminate and aluminum sulfate are mixed in step (1) for a precipitation process. During the process, the pH value of the system is preferably controlled between 8.0 and 10.0. A two-stage precipitation method may be adopted. In the first stage, the pH value of the system is adjusted between 7.3 and 8.5 for precipitation for 10 to 50 minutes; in the second stage, the pH value of the system is adjusted between 8.6 and 10.0 followed by aging. If the pH value of the reaction system does not meet requirements, sodium carbonate may additionally be added for adjustment. The aging time of the product after reaction is preferably the range from 2 to 48 hours, more preferably the range from 2 to 10 hours. The aging temperature is preferably the range from 60° C. to 100° C.

Step (2) of the above method relates to the extruding of the alumina support. The acid added in the pseudo-boehmite powder is a peptizer. Nitric acid, acetic acid, citric acid, phosphoric acid, hydrochloric acid, sulfuric acid or a mixture thereof may be used as the peptizer. Preferably, sesbania powder or methylcellulose may be added in the pseudo-boehmite powder as an extrusion aid. After extruding, the temperature for drying is preferably from 90 to 120° C., and the calcinating temperature is preferably in the range from 450° C. to 650° C.

The optional step (3) relates to the hydro-thermal treatment of the alumina support produced in step (2). The hydro-thermal treatment may be carried out in the water-containing air or in pure water vapor. If the water-containing air is used, the vapor partial pressure (absolute pressure) is preferably in the range from 0.001 to 0.05 MPa. The temperature of the hydro-thermal treatment is preferably in the range from 550° C. to 780° C., and the time is preferably from 2 to 30 hours. The method for preparation of the catalyst of the present invention preferably comprises the hydro-thermal treatment of step (3).

Step (4) of the above method relates to introduction of metal active components and halogen into the support. The support may adopt the sulfate-containing alumina support after direct molding, or the sulfate-containing alumina support after a hydrothermal treatment. In the prepared impregnation solution, the VIII group metal is for example derived from chloroplatinic acid, tetraaminoplatinum dichloride, ammonium chloroplatinate, platinum trichloride, platinum tetrachloride hydrate, dicarbonyl platinum dichloride, dinitrodiarninoplatinum and/or sodium tetranitropalatinate; the VIIB group metal is for example derived from perrhenic acid and/or ammonium perrhenate; and the halogen is for example introduced via HCl.

If the catalyst comprises the rare earth elements according to the present invention, the impregnation solution may further comprise ytterbium, yttrium, europium and/or cerium, which are preferably derived from the nitrate or chloride thereof.

A separate impregnation method may also be adopted in the impregnation for introducing the active components. That is to say, only one metal active component is introduced per impregnation. The support after impregnation is dried and calcinated, and then another metal component is introduced. The active component is preferably introduced through a co-impregnation method. When the active component is introduced through impregnation, saturated impregnation or oversaturated impregnation may be adopted. The liquid-solid volume ratio of the impregnation solution to the support during the impregnation may be from 0.4 to 4.0, preferably from 0.8 to 2.0. The suitable impregnation temperature may be from 15° C. to 90° C., preferably from 20° C. to 50° C. The impregnation time is preferably from 1 to 8 h, more preferably from 2 to 4 h. The prepared impregnation solution should also comprise haloid acid, preferably hydrochloric acid, so as to introduce halogen components and make the metal components distribute uniformly on the whole support. After drying, the impregnated solid is calcination-activated in the air flow. The calcination temperature is preferably from 400° C. to 700° C. The air flow rate with the suitable air/catalyst volume ratio during calcination is preferably 500 to 1000:1. The calcination time is preferably from 4 to 8 hours.

When the oversaturated impregnation is used, the surplus impregnation solution is removed through filtering or vacuum evaporation method. Said vacuum evaporation may be carried out through a rotary vacuum evaporator. Specific methods for operation include: using an aqueous solution prepared with a water soluble compound comprising the respective active components as the impregnation solution, injecting the impregnation solution into the alumina support under 0.001-0.10 MPa and impregnating the alumina support with rotation, the volume ratio of the impregnation solution to the support being from 1.1 to 3.0, rotary linear speed being from 0.01 to 2.0 m/s, then drying and calcination-activating after impregnation. The pressure for injecting the impregnation solution into alumina support is preferably from 0.001 to 0.08 MPa. Rotation is accompanied by heating during the impregnation. The speed of rotation should not be too fast. A rotary linear velocity is preferably from 0.02 to 0.8 m/s, more preferably from 0.05 to 0.5 m/s. After the vacuum rotary impregnation, moisture in the impregnation solution has been basically evaporated, and the catalyst is in a dry state. At the moment, the support can be taken out directly for drying and calcination.

The drying temperature for the solid impregnated with the active components is from 60° C. to 200° C.; the drying time is preferably from 6 to 12 hours; the calcination temperature is from 450° C. to 650° C.; and the calcination time is preferably from 2 to 6 hours.

In the above method, said solutions are all aqueous solutions.

The catalyst obtained after calcination needs to be reduced before contacting with the feedstocks. The reduction is performed in a hydrogen atmosphere, with a preferred reduction temperature from 150° C. to 550° C., a flow rate with hydrogen/catalyst volume ratio of 400:1 to 1400:1, and a reduction time from 2 to 20 hours, more preferably from 4 to 10 hours.

The catalyst of the present invention does not need to be presulfurized before use and can contact naphtha directly for reaction.

The catalyst according to the present invention is suitable for the catalytic reforming reaction of hydrocarbons. Conditions of the reforming reaction may include: pressure in the range from 0.1 MPa to 10.0 MPa, preferably in the range from 0.3 MPa to 2.5 MPa, temperature in the range from 370° C. to 600° C., preferably in the range from 450° C. to 550° C., hydrogen/hydrocarbon volume ratio in the range from 300:1 to 3000:1, preferably in the range from 800:1 to 1500:1, the volume space rate of the feed in the range from $0.1\ h^{-1}$ to $20.0\ h^{-1}$ preferably in the range from $0.5\ h^{-1}$ to $5.0\ h^{-1}$.

Said hydrocarbon feedstocks are preferably a straight-run naphtha with a distillation range from 40° C. to 230° C., or a straight-run naphtha blended with naphtha components produced from coking, catalytic cracking, hydrocracking, coal liquefaction and raffinate of ethylene cracking during petroleum processing.

The present invention is further described through the examples as follows, but the present invention is not limited thereto.

Example 1

(1) Preparation of a $\gamma$-$Al_2O_3$ Support Containing Sulfate Ions 200 of deionized water was added to a gel-forming tank and heated to 60° C. Under sufficient stirring, 200 mL of aluminum sulfate solution (the concentration the aluminum sulfate solution is 50 g/L calculated as alumina) and 140 mL of sodium aluminate solution (the concentration the sodium aluminate solution is 150 g/L calculated as alumina) were simultaneously added to the gel-forming tank. The pH value of reactants was adjusted with the sodium aluminate solution to 7.5 for a neutralization reaction for 30 minutes. Then the pH value of the system was adjusted with the sodium aluminate solution to 9.5, followed by stirring and aging for 30 minutes. Filtration was carried out and a major component of filter cake was pseudo-boehmite. The filter cake was slurry-washed with deionized water for three times at 30° C., and filtered, each time having a water consumption of 500 mL and lasting 30 minutes. The filter cake obtained after the last washing was dried for 12 hours at 120° C. to produce pseudo-boehmite powder, wherein the $Na^+$ content was 0.014% by weight based on dry alumina.

The above pseudo-boehmite powder was kneaded uniformly according to weight ratios of the powder:sesbania powder:nitric acid:acetic acid:citric acid:water=50:1:2:3:3:40, and then extruded to cylinders. The wet cylinders were dried at 120° C. for 12 hours and calcinated at 650° C. for 4 hours to produce a γ-Al$_2$O$_3$ support ZT-1. The SO$_4^{2-}$ content was 0.92% by weight based on the dry alumina.

(2) Preparation of a Catalyst 30 g of the support ZT-1 was taken. Chloroplatinic acid, ammonium perrhenate, ytterbium nitrate and hydrochloric acid were dissolved into an aqueous solution which acted as an impregnation solution, comprising Pt 0.21% by weight, Re 0.46% by weight, Yb 0.211% by weight, and Cl 1.8% by weight (based on the weight of the dry alumina), with a liquid-solid volume ratio being 1.5. The alumina supports were put into a 500 mL flask and vacuumed to less than 0.008 MPa in a rotary vacuum evaporator (produced by Shanghai Yarong Biochemistry Instrument Factory). Then the impregnation solution was introduced into the flask and impregnated the supports at 30° C. with a rotary linear velocity of 0.03 m/s for 3 hours. The solid was in a dry state after being vacuumized at 70° C., dried at 120° C. for 12 hours, calcinated in dry air under conditions of 500° C. and a air/catalyst volume ratio of 700:1 for 4 h, cooled to 150° C., exchanged with hydrogen after an exchange with nitrogen, then reduced with hydrogen under conditions of 480° C. and a hydrogen/catalyst volume ratio of 500:1 for 2 hours. Thereby, a catalyst Cat-1 was obtained. The compositions thereof are shown in Table 1 and the specific surface area (as measured by the use of low-temperature Nitrogen adsorption and calculated by BET theory) and the pore radii distribution thereof are shown in Table 2.

Example 2

A catalyst was prepared according to the method of Example 1, except that in step (2) chloroplatinic acid, ammonium perrhenate and hydrochloric acid were used to prepare an impregnation solution, comprising Pt 0.21% by weight, Re 0.46% by weight and Cl 1.8% by weight (relative to the weight of the dry alumina). After drying, calcination and reduction, a catalyst Cat-2 was obtained. The compositions thereof are shown in Table 1 and the specific surface area and the pore radii distribution thereof are shown in Table 2.

Example 3

(1) Preparation of a γ-Al$_2$O$_3$ Support Containing Sulfate Ions 200 mL of deionized water was added to a gel-forming tank and heated to 60° C. Under sufficient stirring, 200 mL of aluminum sulfate solution (the concentration of the aluminum sulfate solution is 50 g/L calculated as alumina) and 140 mL of sodium aluminate solution (the concentration of the sodium aluminate solution is 150 g/L calculated as alumina) were simultaneously added to the gel-forming tank. The pH value of the reactants was adjusted with the sodium aluminate solution to 7.8 for a neutralization reaction for 30 minutes. Then the pH value of the system was adjusted with the sodium aluminate solution to 9.8 followed by stirring and aging for 30 minutes. Filtration was carried out and a major component of filter cake was pseudo-boehmite. The filter cake was slurry-washed with deionized water for four times at 30° C., and filtered, each time having a water consumption of 500 mL and lasting 30 minutes. The filter cake obtained after the last washing was dried for 12 hours at 120° C. to produce pseudo-boehmite powder, wherein the Na$^+$ content was 0.013% by weight based on the dry alumina.

The above pseudo-boehmite powder was kneaded uniformly according to weight ratios of the powder:sesbania powder:nitric acid:acetic acid:citric acid:water=50:1:2:3:3:40, and then extruded to cylinders. The wet cylinders were dried at 120° C. for 12 hours and calcinated at 650° C. for 4 hours to produce a γ-Al$_2$O$_3$ support ZT-2. The SO$_4^{2-}$ content was 0.48% by weight based on the dry alumina.

(2) Preparation of a Catalyst 30 g of the support ZT-2 was taken to prepare a catalyst according to the method in step (2) of Example 1. The compositions thereof are shown in Table 1 and the specific surface area and the pore radii distribution thereof are shown in Table 2.

Example 4

In the following example, a hydro-thermal treatment was performed to the γ-Al$_2$O$_3$ support containing sulfate ions and then a catalyst was prepared.

(1) Preparation of a Support

The support ZT-1 prepared in Example 1 was taken, and treated at 650° C. in the water-containing air with a water partial pressure of 0.02 MPa (total pressure 0.1 MPa, absolute pressure) for 20 hours to obtain a support ZT-3.

(2) Preparation of a Catalyst 30 g of the support ZT-3 was taken to prepare a catalyst according to the method in step (2) of Example 1. The compositions thereof are shown in Table 1 and the specific surface area and the pore radii distribution thereof are shown in Table 2.

Example 5

30 g of the support ZT-3 prepared in Example 4 was taken to prepare a catalyst according to the method in step (2) of Example 1, except that chloroplatinic acid, ammonium perrhenate, yttrium nitrate and hydrochloric acid were used to prepare an impregnation solution, comprising Pt 0.21% by weight, Re 0.46% by weight, Y 0.30% by weight, and Cl 1.8% by weight (relative to the weight of the dry alumina). After drying, calcination and reduction, a catalyst Cat-5 was obtained. The compositions thereof are shown in Table 1 and the BET surface area and the pore radii distribution thereof are shown in Table 2.

Example 6

30 g of the support ZT-3 prepared in Example 4 was taken to prepare a catalyst according to the method in step (2) of Example 1, except that chloroplatinic acid, ammonium perrhenate, europium nitrate and hydrochloric acid were used to prepare an impregnation solution, comprising Pt 0.21% by weight, Re 0.46% by weight, Eu 0.12% by weight, and Cl 1.8% by weight (relative to the weight of the dry alumina). After drying, calcination and reduction, a catalyst Cat-6 was obtained. The compositions thereof are shown in Table 1 and the specific surface area and the pore radii distribution thereof are shown in Table 2.

Example 7

30 g of the support ZT-3 prepared in Example 4 was taken to prepare a catalyst according to the method in step (2) of Example 1, except that chloroplatinic acid, ammonium perrhenate, yttrium nitrate and hydrochloric acid were used to prepare an impregnation solution, comprising Pt 0.21% by weight, Re 0.46% by weight, Ce 0.31% by weight, and Cl 1.8% by weight (relative to the weight of the dry alumina). After drying, calcination and reduction, a catalyst Cat-7 was obtained. The compositions thereof are shown in Table 1 and the specific surface area and the pore radii distribution thereof are shown in Table 2.

Example 8

30 g of the support ZT-3 prepared in Example 4 was taken to prepare a catalyst according to the method in step (2) of Example 1, except that chloroplatinic acid, ammonium perrhenate and hydrochloric acid were used to prepare an impregnation solution, comprising Pt 0.21% by weight, Re 0.46% by weight, and Cl 1.8% by weight (relative to the weight of the dry alumina). After drying, calcination and reduction, a catalyst Cat-8 was obtained. The compositions thereof are shown in Table 1 and the specific surface area and the pore radii distribution thereof are shown in Table 2.

Example 9

(1) Preparation of a Support

The support ZT-1 prepared in Example 1 was taken, and treated at 750° C. in the water-containing air with a water partial pressure of 0.005 MPa (total pressure MPa, absolute pressure) for 8 hours to obtain a support ZT-4.

(2) Preparation of a Catalyst 30 g of the support ZT-4 was taken to prepare a catalyst according to the method in step (2) of Example 1. The compositions thereof are shown in Table 1 and the specific surface area and the pore radii distribution thereof are shown in Table 2.

Example 10

(1) Preparation of a Support

The support ZT-1 prepared in Example 1 was taken, and treated at 550° C. with water vapor (having a pressure of 0.6 MPa, absolute pressure) for 8 hours to obtain a support ZT-5.

(2) Preparation of a Catalyst 30 g of the support ZT-5 was taken to prepare a catalyst according to the method in step (2) of Example 1, except that chloroplatinic acid, ammonium perrhenate, yttrium nitrate and hydrochloric acid were used to prepare an impregnation solution, comprising Pt 0.21% by weight, Re 0.46% by weight, Y 0.30% by weight, and CA 1.8% by weight (relative to the weight of the dry alumina). After drying, calcination and reduction, a catalyst Cat-10 was obtained. The compositions thereof are shown in Table 1 and the specific surface area and the radii pore distribution thereof are shown in Table 2.

Example 11

(1) Preparation of a Support

The support ZT-1 prepared in Example 1 was taken, and treated at 600° C. with water vapor (having a pressure of 0.6 MPa, absolute pressure) for 5 hours to obtain a support ZT-6.

(2) Preparation of a Catalyst 30 g of the support ZT-6 was taken to prepare a catalyst according to the method in step (2) of Example 1. The compositions thereof are shown in Table 1 and the specific surface area and the pore radii distribution thereof are shown in Table 2.

Example 12

(1) Preparation of a Support

The support ZT-2 prepared in Example 3 was taken, and treated at 650° C. in a water-containing air with a water partial pressure of 0.02 MPa (total pressure 0.1 MPa, absolute pressure) for 20 hours to obtain a support ZT-7.

(2) Preparation of a Catalyst 30 g of the support ZT-7 was taken to prepare a catalyst according to the method in step (2) of Example 1, except that chloroplatinic acid, ammonium perrhenate, yttrium nitrate and hydrochloric acid were used to prepare an impregnation solution, comprising Pt 0.21% by weight, Re 0.46% by weight, Y 0.30% by weight, and Cl 1.8% by weight (based on the weight of the dry alumina). After drying, calcination and reduction, a catalyst Cat-12 was obtained. The compositions thereof are shown in Table 1 and the specific surface area and the pore radii distribution thereof are shown in Table 2.

Comparative Example 1

(1) Preparation of an Alumina Support According to the Method of CN102139221B 200 mL of deionized water was added to a gel-forming tank and heated to 60° C. Under sufficient stirring, 200 mL of aluminum sulfate solution with a concentration of 50 g/L calculated as alumina and 140 mL of sodium aluminate solution with a concentration of 150 g/L based on alumina were simultaneously added to the gel-forming tank. The sodium aluminate solution was added to adjust the pH value of the reactants to 8.0 for a neutralization reaction for 30 minutes. Then the pH value of the systems adjusted with the sodium aluminate solution to 10.0, followed by stirring and aging for 30 minutes. Filtration was conducted and a major component of resulted filter cake was pseudo-boehmite, which comprised about 30 g of dry alumina. The filter cake was washed with deionized water at 40° C. for six times, each time having water consumption of 500 mL and lasting 30 minutes. The filter cake obtained after the last washing was dried at 120° C. for 12 hours to produce pseudo-boehmite powder.

The above pseudo-boehmite powder was taken and kneaded uniformly according to weight ratios of powder:sesbania powder:nitric acid:acetic acid:citric acid:water=50:1:2:3:3:40, and then extruded to cylinders. The wet cylinders were dried at 120° C. for 12 hours and calcinated at 650° C. for 6 hours to produce a γ-Al$_2$O$_3$ support ZT-8, wherein the Na$^+$ content was 0.012% by weight based on the dry alumina and the SO$_4^{2-}$ content was 0.30% by weight based on the dry alumina.

(2) Preparation of a Catalyst 30 g of the support ZT-8 was taken to prepare a catalyst according to the method in step (2) of Example 1. The compositions thereof are shown in Table 1 and the specific surface area and the pore radii distribution thereof are shown in Table 2.

Comparative Example 2

A catalyst was prepared according to the method of Comparative Example 1, except that in step (2) chloroplatinicacid, ammoniumperrhenate and hydrochloric acid were used to prepare an impregnation solution, comprising Pt 0.21% by weight, Re 0.46% by weight and Cl 1.8% by weight (based on the weight of the dry alumina). After drying, calcination and reduction, a catalyst Cat-14 was obtained. The compositions thereof are shown in Table and the specific surface area and the pore radii distribution thereof are shown in Table 2.

Comparative Example 3

30 g of industrial cylinder-type γ-Al$_2$O$_3$ support (produced by Sinopec Catalyst CO., LTD, Changling Division, prepared by highly pure pseudo-boehmite prepared by hydrolysis of alkoxylaluminium) was taken to prepare a catalyst according to the method in step (2) of Example 1, except that the catalyst after reduction was cooled to 425° C. and 0.1.0% by weight (relative to the weight of the catalyst) of hydrogen sulfide was added in the hydrogen stream to presulfurize the catalyst. The compositions thereof are shown in Table 1 and the specific surface area and the pore radii distribution thereof are shown in Table 2.

Comparative Example 4

30 g of said industrial cylinder-type γ-Al$_2$O$_3$ support (produced by Sinopec Catalyst CO., LTD, Changling Division) of Comparative Example 3 was taken to prepare a catalyst according to the method in at (2) of Example 1, except that chloroplatinic acid, ammonium perrhenate and hydrochloric acid were used to prepare an impregnation solution, comprising Pt 0.21% by weight, Re 0.46% by weight and Cl 1.8% by weight (relative to the weight of the dry alumina). The compositions thereof are shown in Table 1 and the specific surface area and the radii pore distribution thereof are shown in Table 2.

Comparative Example 5

200 mL of sodium aluminate solution with a concentration of 250 g/L calculated as alumina was added to a gel-forming tank. Then a suitable amount of nitric acid was added to the sodium aluminate solution so that the pH value of the reaction system was 8.0. A white suspension was obtained and stirred violently for 1 hour. Then 4.5 mL of H$_2$SO$_4$ solution with content of 15% by weight (with a density of about 1.102 g/mL at 20° C.) was added to the above white suspension and continued to be stirred for 1 hour. After filtration, a major component of the filter cake as obtained was aluminium hydroxide, which comprised about 50 g of dry alumina. The filter cake was washed with deionized water at 40° C. for three times, each time having a water consumption of 600 mL and lasting 30 minutes. The filter cake obtained after the last washing was dried at 120° C. for 12 hours to produce aluminium hydroxide powder containing SO$_4^{2-}$, wherein the Na$^+$ content was 0.132% by weight based on the dry alumina.

The above aluminium hydroxide powder was taken and kneaded uniformly according to weight ratios of the powder:sesbania powder:nitric acid:acetic acid:citric acid:water=50:1:2:3:3:40, and then extruded to cylinders. The wet cylinders were dried in an air atmosphere and at 25° C. for 24 hours, then dried at 150° C. for 2 hours and calcinated at 750° C. for 6 hours to produce a γ-Al$_2$O$_3$ support ZT-9, wherein the SO$_4^{2-}$ content was 0.93% by weight based on the dry alumina.

(2) Preparation of a Catalyst 30 g of the support ZT-9 was taken to prepare a catalyst according to the method in step (2) of Example 1, except that in step (2) chloroplatinic acid, ammonium perrhenate and hydrochloric acid were used to prepare an impregnation solution, comprising Pt 0.21% by weight, Re 0.46% by weight and Cl 1.8% by weight (based on the weight of the dry lumina). After drying, calcination and reduction, a catalyst Cat-17 was obtained. The compositions thereof are shown in Table 1 and the specific surface area and the pore radii distribution thereof are shown in Table 2.

Comparative Example 6

A catalyst was prepared according to the method of Comparative Example 5, except that in step (1) the resulted filter cake was washed with deionized water at 40° C. for six times, each time having a water consumption of 600 mL, to produce a γ-Al$_2$O$_3$ support ZT-10, wherein the Na$^+$ content was 0.067% by weight based on dry alumina and the SO$_4^{2-}$ content was 0.91% by weight based on the dry alumina. A catalyst Cat-18 was obtained according to the same method. The compositions thereof are shown in Table 1 and the specific surface area and the pore radii distribution thereof are shown in Table 2.

Comparative Example 7

200 mL of sodium aluminate solution with a concentration of 250 g/L calculated as the alumina was added to a gel-forming tank. Then a suitable amount of nitric acid was added to the sodium aluminate solution so that the pH value of the reaction system was 8.0. A white suspension liquid was obtained and stirred violently for 1 hour. After filtration, a major component of the filter cake as obtained was aluminium hydroxide, which comprised about 50 g of dry alumina. The filter cake was washed with deionized water at 40° C. for three times, each time having a water consumption of 600 mL and lasting 30 minutes. The filter cake obtained after the last washing was dried at 120° C. for 12 hours to produce aluminium hydroxide powder, wherein the Na$^+$ content was 0.111% by weight based on the dry alumina.

The above aluminium hydroxide powder was taken and kneaded uniformly according to weight ratios of the powder:sesbania powder:nitric acid:acetic acid:citric acid:water=50:1:2:3:3:40, and then extruded to cylinders. The wet cylinders were dried in an air atmosphere and at 25° C. for 24 hours, then dried at 150° C. for 2 hours and calcinated at 550° C. for 6 hours to produce a γ-$Al_2O_3$ support ZT-11. Then 30 g of the support ZT-11 and 3 mL of $H_2SO_4$ solution with content of 15% by weight (with a density of about 1.102 g/mL at 20° C.) were added to 45 mL of deionized water to formulate a solution containing $SO_4^{2-}$. Then the support ZT-11 was impregnated with the solution, dried, and calcinated at 600° C. for 6 hours to obtain a support ZT-12 containing $SO_4^{2-}$, wherein the $SO_4^{2-}$ content was 0.98% by weight based on the dry alumina.

(2) Preparation of a Catalyst 20 g of the support ZT-12 was taken to prepare a catalyst according to the method in step (2) of Example 1, except that in step (2) chloroplatinic acid, ammonium perrhenate and hydrochloric acid were used to prepare an impregnation solution, comprising Pt 0.21% by weight, Re 0.46% by weight and Cl 1.8% by weight (based on the weight of the dry alumina). After drying, calcination and reduction, a catalyst Cat-19 was obtained. The compositions thereof are shown in Table 1 and the specific surface area and the pore radii distribution thereof are shown in Table 2.

Comparative Example 8

In this example, the γ-$Al_2O_3$ support containing sulfate ions prepared in Comparative Example 5 was used for subjecting to a hydro-thermal treatment and then a catalyst was prepared.

(1) Preparation of a Support

The support ZT-9 prepared in Comparative Example 5 was taken, and treated at 650° C. in a water-containing air with a water partial pressure of 0.02 MPa total pressure 0.1 MPa, absolute pressure) for 20 hours to obtain a support ZT-13.

(2) Preparation of a Catalyst 30 g of the support ZT-13 was taken to prepare a catalyst according to the method in step (2) of Comparative Example 5. The compositions thereof are shown in Table 1 and the specific surface area and the pore radii distribution thereof are shown in Table 2.

Examples 13-32

5 mL of a catalyst was filled in a microreactor. The refined naphtha with the properties listed in Table 3 was used as the feedstock to evaluate the performance of the catalyst. Conditions for evaluation tests include: reaction temperature 500° C., pressure 1.0 MPa, feedstock weight space velocity 4 $h^{-1}$, hydrogen/feedstock volume ratio 1200:1. Catalysts used in the examples and reaction results are shown in Table 4.

According to Table 4, compared with industrial catalysts Cat-15 and Cat-16 presulfurized with hydrogen sulfide, in the present invention the catalyst with the support not going through hydro-thermal treatment was simply prepared due to requiring no presulfurization and could achieve an equivalent aromatic yield, moreover the catalyst with the support going through hydro-thermal treatment had a higher aromatic yield. Compared with comparative catalysts Cat-13 and Cat-14 with a low content of sulfate ions in the support, the catalyst of the present invention had a higher aromatic yield.

TABLE 1

| Example | Catalyst No. | Support No. | $SO_4^{2-}$ content in the support, % by weight | $Na^+$ content in the support, % by weight | content of active components in the support, % by weight | | | |
|---|---|---|---|---|---|---|---|---|
| | | | | | Pt | Re | rare earth | Cl |
| 1 | Cat-1 | ZT-1 | 0.92 | 0.014 | 0.21 | 0.46 | Yb 0.21 | 1.12 |
| 2 | Cat-2 | ZT-1 | 0.92 | 0.014 | 0.21 | 0.46 | — | 1.14 |
| 3 | Cat-3 | ZT-2 | 0.48 | 0.013 | 0.21 | 0.45 | Yb 0.21 | 1.12 |
| 4 | Cat-4 | ZT-3 | 0.91 | 0.014 | 0.21 | 0.46 | Yb 0.21 | 1.15 |
| 5 | Cat-5 | ZT-3 | 0.91 | 0.014 | 0.21 | 0.46 | Y 0.30 | 1.16 |
| 6 | Cat-6 | ZT-3 | 0.91 | 0.014 | 0.21 | 0.46 | Eu 0.12 | 1.15 |
| 7 | Cat-7 | ZT-3 | 0.91 | 0.014 | 0.21 | 0.46 | Ce 0.31 | 1.15 |
| 8 | Cat-8 | ZT-3 | 0.91 | 0.014 | 0.21 | 0.46 | — | 1.15 |
| 9 | Cat-9 | ZT-4 | 0.91 | 0.014 | 0.21 | 0.46 | Yb 0.21 | 1.13 |
| 10 | Cat-10 | ZT-5 | 0.91 | 0.014 | 0.21 | 0.45 | Y 0.30 | 1.14 |
| 11 | Cat-11 | ZT-6 | 0.91 | 0.014 | 0.21 | 0.46 | Yb 0.21 | 1.14 |
| 12 | Cat-12 | ZT-7 | 0.48 | 0.013 | 0.21 | 0.46 | Y 0.30 | 1.14 |
| Comparative Example 1 | Cat-13 | ZT-8 | 0.30 | 0.012 | 0.21 | 0.45 | Yb 0.21 | 1.13 |
| Comparative Example 2 | Cat-14 | ZT-8 | 0.30 | 0.012 | 0.21 | 0.45 | — | 1.15 |
| Comparative Example 3 | Cat-15 | industrial bar-type γ-$Al_2O_3$ | 0 | 0.001 | 0.21 | 0.46 | Yb 0.21 | 1.16 |
| Comparative Example 4 | Cat-16 | industrial bar-type γ-$Al_2O_3$ | 0 | 0.001 | 0.21 | 0.45 | — | 1.15 |
| Comparative Example 5 | Cat-17 | ZT-9 | 0.93 | 0.132 | 0.21 | 0.45 | — | 1.12 |
| Comparative Example 6 | Cat-18 | ZT-10 | 0.91 | 0.067 | 0.21 | 0.45 | — | 1.13 |
| Comparative Example 7 | Cat-19 | ZT-12 | 0.91 | 0.111 | 0.21 | 0.45 | — | 1.11 |
| Comparative Example 8 | Cat-20 | ZT-13 | 0.91 | 0.132 | 0.21 | 0.45 | — | 1.11 |

TABLE 2

| Catalyst No. | specific surface area, m²/g | pore radii distribution, volume % | | |
|---|---|---|---|---|
| | | <3 nm | 3~10 nm | >10 nm |
| Cat-1 | 288 | 32.2 | 64.7 | 3.1 |
| Cat-2 | 286 | 33.4 | 64.1 | 2.5 |
| Cat-3 | 291 | 35.1 | 60.3 | 4.6 |
| Cat-4 | 235 | 11.3 | 82.8 | 5.9 |
| Cat-5 | 236 | 11.6 | 83.0 | 5.4 |
| Cat-6 | 235 | 11.0 | 83.4 | 5.6 |
| Cat-7 | 234 | 11.1 | 83.9 | 5.0 |
| Cat-8 | 235 | 11.2 | 83.5 | 5.3 |
| Cat-9 | 229 | 9.1 | 83.8 | 7.1 |
| Cat-10 | 231 | 12.1 | 82.5 | 5.4 |
| Cat-11 | 222 | 8.4 | 84.7 | 6.9 |
| Cat-12 | 233 | 11.7 | 82.6 | 5.7 |
| Cat-13 | 276 | 30.4 | 66.2 | 3.4 |
| Cat-14 | 276 | 30.8 | 66.5 | 2.7 |
| Cat-15 | 189 | 14.3 | 85.2 | 0.5 |
| Cat-16 | 188 | 14.3 | 85.4 | 0.3 |
| Cat-17 | 271 | 41.5 | 55.7 | 2.8 |
| Cat-18 | 269 | 39.2 | 57.5 | 3.3 |
| Cat-19 | 278 | 42.7 | 54.2 | 3.1 |
| Cat-20 | 204 | 15.8 | 77.8 | 6.4 |

TABLE 3

| Boiling range, °C. initial boiling point/ final boiling point | Density ($d_{20}$), g/cm³ | Composition of hydrocarbons, % by weight | | |
|---|---|---|---|---|
| | | Paraffins | Naphthenes | Aromatics |
| 82/163 | 0.7429 | 46.49 | 40.69 | 11.68 |

TABLE 4

| Example | Catalyst No. | Liquid yield, % by weight | Aromatic yield, % by weight |
|---|---|---|---|
| 13 | Cat-1 | 91.55 | 63.27 |
| 14 | Cat-2 | 90.87 | 63.28 |
| 15 | Cat-3 | 91.19 | 63.08 |
| 16 | Cat-4 | 92.28 | 66.83 |
| 17 | Cat-5 | 92.09 | 66.34 |
| 18 | Cat-6 | 91.77 | 66.87 |
| 19 | Cat-7 | 92.56 | 66.28 |
| 20 | Cat-8 | 91.87 | 65.57 |
| 21 | Cat-9 | 91.97 | 66.66 |
| 22 | Cat-10 | 92.38 | 66.55 |
| 23 | Cat-11 | 92.24 | 66.81 |
| 24 | Cat-12 | 92.49 | 66.18 |
| 25 | Cat-13 | 91.81 | 62.59 |
| 26 | Cat-14 | 91.04 | 62.11 |
| 27 | Cat-15 | 91.84 | 63.59 |
| 28 | Cat-16 | 91.74 | 62.94 |
| 29 | Cat-17 | 86.50 | 58.55 |
| 30 | Cat-18 | 86.61 | 58.21 |
| 31 | Cat-19 | 86.32 | 58.42 |
| 32 | Cat-20 | 88.27 | 59.36 |

We claim:

1. A naphtha reforming catalyst, comprising: a sulfate ion-containing alumina support, and a VIII group metal of 0.1-2.0% by weight, a VIIB group metal of 0.1-3.0% by weight, and a halogen of 0.5-3.0% by weight supported on the alumina support,
wherein the alumina support comprises sulfate ions of 0.45-3.0% by weight and a sodium content of 0.008-0.03% by weight,
wherein the weight percentages are calculated based on a weight of the alumina support, and
wherein, in said catalyst, a ratio of a pore volume of pores with a pore radius between 3 nm and 10 nm to a total pore volume is from 60% to 85%, a ratio of a pore volume of pores with a pore radius smaller than 3 nm to the total pore volume is not more than 36%, and a ratio of a pore volume of pores with a pore radius larger than 10 nm to the total pore volume is more than 2%.

2. The catalyst according to claim 1, characterized in that said catalyst further comprises 0.01% to 3.0% by weight, based on the weight of the alumina support, of one or more rare earth elements selected from the group consisting of ytterbium, yttrium, europium and cerium.

3. The catalyst according to claim 2, characterized in that said VIII group metal is selected from the group consisting of platinum, ruthenium, rhodium and iridium; the VIIB group metal is rhenium; and the halogen is chlorine.

4. The catalyst according to claim 2, characterized in that said catalyst has content of sulfate ions of 0.45-2.0% by weight.

5. The catalyst according to claim 2, characterized in that a specific surface area of said catalyst is from 180 m²/g to 300 m²/g.

6. The catalyst according to claim 2, characterized in that said sulfate ion-containing alumina support has content of sodium of from 0.01% to 0.03% by weight.

7. The catalyst according to claim 2, characterized in that in said catalyst, the ratio of the pore volume of the pores with a pore radius between 3 nm and 10 nm to the total pore volume is from 70% to 85%; the ratio of the pore volume of the pores with a pore radius smaller than 3 nm to the total pore volume is not more than 25%; and the ratio of the pore volume of the pores with a pore radius larger than 10 nm to the total pore volume is from 5% to 10%.

8. The catalyst according to claim 1, characterized in that said VIII group metal is selected from the group consisting of platinum, ruthenium, rhodium and iridium; the VIIB group metal is rhenium; and the halogen is chlorine.

9. The catalyst according to claim 1, characterized in that said catalyst comprises sulfate ions of 0.45-2.0% by weight.

10. The catalyst according to claim 1, characterized in that a specific surface area of said catalyst is from 180 m²/g to 300 m²/g.

11. The catalyst according to claim 1, characterized in that said sulfate ion-containing alumina support comprises sodium of from 0.01% to 0.03% by weight.

12. The catalyst according to claim 1, characterized in that in said catalyst, the ratio of the pore volume of the pores with a pore radius between 3 nm and 10 nm to the total pore volume is from 70% to 85%, the ratio of the pore volume of the pores with a pore radius smaller than 3 nm to the total pore volume is not more than 25%, and the ratio of the pore volume of the pores with a pore radius larger than 10 nm to the total pore volume is from 5% to 10%.

13. A method for preparation of the catalyst according to claim 1, comprising the following steps:
(1) mixing sodium aluminate and aluminum sulfate in a molar ratio of 1 to 10:1, controlling pH value of a solution to between 7 and 11 to obtain a precipitation by a two-stage precipitation method, wherein in the first stage, the pH value of the system is adjusted between 7.3 and 8.5 for precipitation for 10 to 50 minutes, and in the second stage, the pH value of the system is adjusted between 8.6 and 10.0 followed by aging, the aging being at a temperature in the range of 60° C. to 150° C., and the solid substance obtained subjecting to water-washing and drying to produce a pseudo-boehmite powder containing sulfate ions, wherein the sulfate ions is 0.45% to 3.0% by weight calculated based on a weight of alumina;

(2) adding an acidic solution in the pseudo-boehmite powder produced in step (1), for kneading and extruding, then drying and calcinating to produce the alumina support containing sulfate ions;

(3) optionally subjecting the alumina support produced in step (2) to a hydro-thermal treatment at a temperature in the range of 450° C. to 850° C.;

(4) impregnating the alumina support produced in step (2) or the alumina support produced in in step (3) with an aqueous solution comprising the VIII group metal, the VIIB group metal and the halogen, then drying and calcinating the impregnated alumina support.

14. The method according to claim 13, characterized in that the method comprises said hydro-thermal treatment in step (3).

15. The method according to claim 13, characterized in that the impregnation solution in step (4) further comprises ytterbium, yttrium, europium and/or cerium.

16. The method according to claim 15, characterized in that ytterbium, yttrium, europium and/or cerium in the impregnation solution are derived from a nitrate and/or a chloride thereof.

17. The method according to claim 13, characterized in that the hydro-thermal treatment in step (3) is carried out in humidified air or in steam for 2 hours to 30 hours.

18. The method according to claim 13, characterized in that the product after the reaction in step (1) is aged for 2 hours to 48 hours.

19. The method according to claim 13, characterized in that in the impregnation solution of step (4), the VIII group metal is derived from chloroplatinic acid, tetraaminoplatinum dichloride, ammonium chloroplatinate, platinum trichloride, platinum tetrachloride hydrate, dicarbonyl platinum dichloride, dinitrodiaminoplatinum and/or sodium tetranitropalatinate.

20. The method according to claim 13, characterized in that in the impregnation solution of step (4), the VIIB group metal is derived from perrhenic acid and/or ammonium perrhenate, and the halogen is introduced via HCl.

* * * * *